United States Patent [19]
Uehara et al.

[11] 3,805,148
[45] Apr. 16, 1974

[54] METHOD FOR MEASURING NITROGEN OXIDES IN POLLUTION AIR AND DEVICE FOR PERFORMING THE SAME METHOD

[75] Inventors: Hiromichi Uehara, Sagamihara; Yasuharu Ijuin, Tokyo, both of Japan

[73] Assignee: Sagami Chemical Research Center, Tokyo, Japan

[22] Filed: May 25, 1972

[21] Appl. No.: 256,729

Related U.S. Application Data

[63] Continuation-in-part of Ser. No. 65,767, Aug. 21, 1970, abandoned.

[30] Foreign Application Priority Data
Mar. 31, 1970 Japan.............................. 45-26561

[52] U.S. Cl. ...................... 324/0.5 R, 325/58.5 C
[51] Int. Cl. ........................................... G01n 27/78
[58] Field of Search........ 324/0.5 R, 0.5 A, 0.5 AH, 324/58.5 C, 58 C

[56] References Cited
UNITED STATES PATENTS
3,348,135   10/1967   Howgate........................ 324/0.5 A
3,456,185   7/1969   Akao............................... 324/58.5 C
3,691,454   9/1972   Hrubesh......................... 324/58.5 C

OTHER PUBLICATIONS

A. Carrington et al. – Stark Modulated Gas Phase Electron Resonance Cavity – Rev. Sci. Instr. – 38(8) – Aug. 1967 pp. 1183–1184.

Primary Examiner—Michael J. Lynch
Attorney, Agent, or Firm—Flynn & Frishauf

[57] ABSTRACT

NO and/or $NO_2$ is measured by sampling gas containing them in a very small sampling tube and introducing the gas into a C band (i.e., $4GH_2$) EPR cavity resonator, which is provided with Stark electrodes and Zeeman modulation coils for providing Stark and Zeeman modulations selectively to thereby detect NO by Stark modulation and $NO_2$ by Zeeman modulation. For a gas containing NO and/or $NO_2$ at low concentration, the content thereof is firstly cold-adsorbed in an adsorbent and after removing the residual components it is discharged from the adsorbent into the C band EPR cavity resonator previously evacuated.

8 Claims, 6 Drawing Figures

METHOD FOR MEASURING NITROGEN OXIDES IN POLLUTION AIR AND DEVICE FOR PERFORMING THE SAME METHOD

RELATED APPLICATION

This invention is a continuation-in-part of U.S. Pat. Application Ser. No. 65,767, filed Aug. 21, 1970, now abandoned.

The present invention relates to measurement of gaseous paramagnetic substances and, more particularly, to a method for measuring NO and $NO_2$ contained in polluted air and an apparatus for performing the same method.

It is well known that NO and $NO_2$ are air polluting substances, and the necessity of precise measurements of NO and $NO_2$ contained in, for example, the polluted air on cities, the exhaust gases of factories and the automobile exhaust gas etc. becomes increased. As to the prior methods for measuring these substances which are wide-spread there are the Saltzman method, as a chemical method, and NDIR (Non-Dispersive Infra-Red Analyser) for NO and NDUV (Non-Dispersive Ultra Violet Analyser) for $NO_2$, as physical methods.

The Saltzman method utilizes the fact that $NO_2$ reacts with hydrochloric acid addition salt of N (1 - naphtyl) ethylene diamine and sulfanilic acid to form an azo dye and the resulting dye is colorimetrically analysed to measure $NO_2$. In this method, NO is firstly oxidized to make it to $NO_2$ and then the resulting $NO_2$ is measured in the same way. This method has been relatively widely employed for the measurement of nitric oxide and nitrogen dioxide in the polluted city air because of its high sensitivity. For the measurement of relatively highly concentrated pollution sources in factory exhaust gas and/or automobile exhaust gas etc., this method, however, has been considered as not suitable because it requires reagents and time consumption, and further it is difficult to measure instantaneous values and a continuous analysis is difficult, etc. Further, in relation to this method, there are problems in analysis the polluted air on cities as to the efficiency of collecting $NO_2$ using adsorbent liquid and the rate of reaction thereof, and an additional problem occurs as to the quantum of oxidization of NO. Although this method is considered as being not affected by other components so much, some disturbance due to such components does exist necessarily because of its nature that it utilizes chemical reactions. In fact, by this method, almost all of ethyl nitrite ($C_2H_5ONO$), butyl nitrite ($C_4H_9ONO$) and methyl nitrite ($CH_3ONO$) etc. are detected as $NO_2$.

Since the measurements of NO by means of NDIR and $NO_2$ by means of NDUV are affected by other components such as water, hydrocarbon, etc., it is difficult to use it to detect them having concentrations less than 200 ppm. Further since the sensitivities themselves of NDIR and NDUV are very low, they can not be used to measure NO and $NO_2$ having concentrations less than 1 ppm such as in the case of air pollution. For the measurement of pollution sources in the case where the concentrations of NO and/or $NO_2$ is in the order of from several ten to several hundred ppm, the sensitivities are too low to obtain accurate measurement values. Since the current tendency of the regulation law of automobile exhaust gas is being changed from the concentration basis to the mass basis, it is better that the exhaust gas sample be collected into a bag and then analysed. As to a collecting method of sample, when a constant volume sample is employed the sample gas will be diluted by air and so it is necessary to analyse precisely such diluted low concentration sample. Further in this case since NO in the sample gas within the bag is gradually converted to $NO_2$ it is necessary to analyse both of NO and $NO_2$ simultaneously precisely, which has not been possible with the conventional analysis methods.

An object of the present invention is to provide a novel method of measuring NO and $NO_2$ utilizing the fact that NO and $No_2$ are stable paramagnetic gases and can be detected by gaseous EPR (Electron Paramagnetic Resonance), and to provide an apparatus suitable to perform the same method which substantially eliminates the defects of the conventional methods.

According to the present method, the following features are realized:

a. Since in the present method quantitative analysis of NO or $NO_2$ is performed on the basis of the strength of gas-phase EPR spectrum of either of them, NO and/or $NO_2$ are measured independently without any disturbances due to the kinds and masses of other coexisting components, b. NO or $NO_2$ at any concentration in the range from 0.033 ppm to 100 percent is measured accurately, c. With the very high sensitivity of the present method, the volume of sample gas is minimized, i.e., for example, 10 cc for high concentration pollution and 80 – 500 cc for low concentration pollution, d. The measurement of instantaneous concentrations of pollutants is facilitated, e. Since the present method is a physical method, the continuous measurement and/or automatic measurement can be facilitated. A fact that the paramagnetic gases in polluted air are only $O_2$, NO and $NO_2$ and only NO or $NO_2$ is selectively detected by Stark modulation and/or Zeeman modulation of the EPR by properly selecting the pressure conditions of the sample.

The above described fact will be described in more detail.

The second fact will be described hereinafter.

Gaseous paramagnetic substances in polluted air are only $O_2$, NO and $NO_2$. Although all of the paramagnetic substances be detected theoretically by EPR, a more detailed consideration should be made for gaseous EPR. Firstly, among $O_2$, NO and $NO_2$, those having electric dipole moment are NO and $NO_2$. Since Stark modulation is applied to the electric dipole moment, $O_2$ is not detected at all by the Stark modulated gaseous EPR. Comparing NO and $NO_2$, NO is a linear molecule, that is, diatomic molecular, while $NO_2$ is non-linear. This fact is a second base for detecting either NO or $NO_2$ independently selectively. Where paramagnetic radicals are of the linear type, such as NO, the axis component of the electron orbital moment is conserved and a magnetic moment is introduced due to the orbital moment. The direction of this magnetic moment is intimately related to the axis direction of the molecule. The axis direction of the molecule is the direction of the electric dipole moment. Further when a spin-angular momentum is given thereto, a magnetic moment is necessarily induced thereby. For the linear radicals, since there is a very large spin-orbit interaction, the direction of the magnetic moment due to the spin-angular momentum is intimately related to the magnitude of the magnetic moment due to the electron orbital movement and hence is intimately related to the direction of the electric dipole moment. In the Stark modulated gaseous EPR, the Stark modulation affects the electric dipole moment and the static magnetic field affects the magnetic moment. As above described, for NO, since the direction of electric dipole moment and the direction of magnetic moment are intimately inter-related, the EPR spectrum in which the respective rotational states are well separated is measured at low sample pressure (less than several tenths Torr) by the Stark modulated gaseous EPR as the so-called microwave Zeeman effect. The measurement is performed by irradiating the sample with a microwave at fixed frequency and simultaneously sweeping the external magnetic field at low rate. For $NO_2$ which is non-linear, the orbital moment of an unpaired electron has no good quantum number and therefore it has no magnetic moment due to the electron orbital movement. Although such radicals have the magnetic moment due to unpaired electron spin, the magnetic moment due to unpaired electron spin and the electric dipole moment acts independently of each other because, for such radicals, there is no spin-orbital interaction such as for the linear radicals. Accordingly the Stark modulation for $NO_2$ acts on the electric dipole moment and the static magnetic field acts on the magnetic moment. However, since there is no interaction therebetween, $No_2$ can not be detected by the Stark modulated gaseous EPR.

On the other hand, in the Zeeman modulated gaseous EPR, since respective $O_2$, NO and $NO_2$ have magnetic moments due to spin-angular momentum or orbital angular momentum and both of the modulation and the static magnetic field affect the magnetic moment, spectra of $O_2$, NO and $NO_2$ at low pressure can be measured separately by using Zeeman modulated gaseous EPR. However, it is found that, by utilizing the principle which will be described subsequently, the spectrum of only $NO_2$ can be detected with high sensitivity by Zeeman modulated gaseous EPR. That is, NO has very large spin-orbital interaction as above described and $O_2$ is in triplet state and has very large spin-spin interaction. Due to such very large interaction, the molecular g values for the respective rotational levels become completely different from each other. For this reason, the gaseous EPR spectra of low pressure NO, $O_2$ samples are measured at completely different magnetic field strengths for respective rotational levels. On the other hand, for $NO_2$, there is no such large interaction as above mentioned. Accordingly since the rotational moment of the whole molecular and the magnetic moment due to spin are independent of each other, the g values of the moleculer at all rotational levels will be almost the same ($g \approx 2$). Where the sample pressure is selected as atmospheric pressure, the spectra of NO and $O_2$ disappear as the whole because the width of spectra for NO and $O_2$ at their respective rotational levels are broadened due to the intermoleculer collisions and the positions of the spectra are completely different. However, for $NO_2$, since, although the width of the spectrum is increased due to the intermoleculer collisions, the moleculer values at all rotational levels are the same, all of the rotational levels are added, so that the ($g \approx 2$) Zeeman modulated gaseous EPR spectrum is observed by sweeping the external magnetic field at a low rate as a very strong wide line absorption even at the atmospheric pressure. This fact is considered as one of the features of the present invention which should be particularly pointed out. There have been no prior art teaching that such gaseous sample containing $NO_2$ provides a very strong EPR signal at an atmospheric pressure for the reason stated above, and there is no method and/or apparatus for detecting $NO_2$ in polluted air sample at atmospheric pressure by utilizing this fact.

The above described is the reason why, irrespective of any coexisting substances, NO and $NO_2$ are able to be observed by Stark modulated gaseous EPR at low pressure and Zeeman modulated gaseous EPR at atmospheric pressure, respectively.

Generally, EPR measurement is performed at X band (9 $GH_z$). However, in the present invention the quantitative analysis of NO becomes possible by constructing a C band cylindrical TEoln mode cavity resonator having a sample volume as large as 16 – 17 times that of the conventional X band cavity resonator. As will be described in detail, the quantitative analysis of NO of concentration less than several hundred ppm is performed by cold-adsorbing NO contained in an 80 – 500 cc polluted air sample into an adsorbent (e.g. colite), removing other components in the sample air, and then feeding NO discharged from the adsorbent into a C band cavity resonator whose volume is 670 cc and maintained at very low pressure (vacuum) to measure the concentration of NO in the low pressure sample.

Since the polluted air includes not only NO and $NO_2$, but also $CO_2$, CO and $SO_2$ etc., on cold-adsorbent NO, small amounts of air, $NO_2$, $CO_2$, CO and $SO_2$ etc. are also adsorbed. Since when NO is discharged from the adsorbent all of the remaining components are also discharged and fed to the cavity, the gas pressure within the C band cavity resonator becomes in the order of 0.06 torr. When the same sample volume was fed to the conventional X band cavity resonator whose internal volume is 1/16 – 17 in comparison with that of the present cavity, the sample pressure should be increased up to the order of 1.0 torr. On the other hand, the optimum pressure condition of spectral intensity for the detection of NO is less than 0.1 torr. The sensitivity of NO detection of 1.0 torr sample gas is substantially lowered because the spectrum is remarkably weakened and substantially disappears due to the so-called pressure broadening. COnsequently, the analysis of NO is performed with high sensitivity by the use of the present C band cavity resonator.

Using such C band resonator, a further advantage is obtained in that the magnet size to be used can be minimized and hence the weight thereof is also minimized. That is, when the conventional X band cavity resonator is used, the magnetic field strength required to detect NO is larger than 8,500 G. The required magnetic field strength is about 4,000 G when the present C band cavity resonator is used. This is a very important advantage of the present invention.

Incidentally, $NO_2$ can also be detected by using a conventional X band Zeeman modulation cavity resonator. ALso, NO can, in cases where the lowering of sensitivity to a considerable extent is not called in question, be detected even by an X band Stark modulation cavity resonator.

These and other objects and advantages of the present invention will become apparent from reading the following description of the present invention with reference to the drawings, in which FIG. 1 is a diagrammatic illustration of the device for performing the present method in which NO or $NO_2$ in highly polluted sample is detected;

Figure 1:
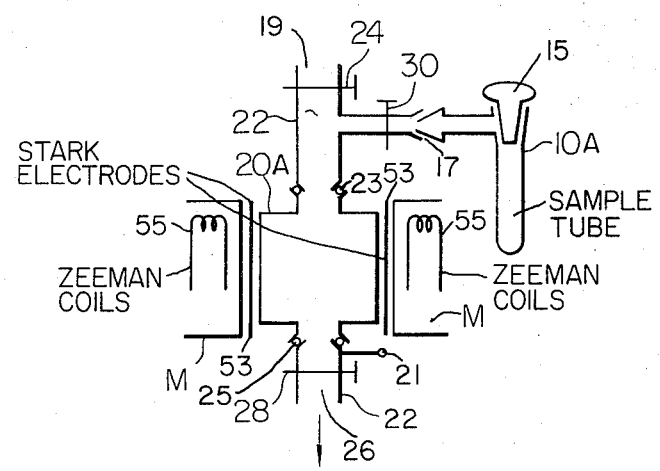

Next, the method of this invention is explained on the basis of the drawings. FIG. 1 illustrates a device for measuring NO or $NO_2$ with respect to a polluted sample of relatively high concentration, said device using a sample tube 10A and an EPR cavity resonator 20A. The sample tube 10A, being made portable, is a small-sized glass vessel having a capacity of 10 – 50cc which is provided with a greaseless vacuum cock 15 and a greaseless adaptable joint 17. This joint 17 is sealed with an O-ring. The EPR cavity resonator 20A is of the TEoln mode designed to resonate at C band (4.3 $GH_z$). The sample gas of normal pressure collected in the sample tube 10A is directly introduced into the thoroughly exhausted EPR cavity resonator, wherein NO or $NO_2$ is detected. The procedures for this detection are as follows.

The sample tube 10A containing the collected normal pressure sample is coupled to a sample observation system by means of 17. 24, 28 and 30 are greaseless stop cocks. 22 is a hard glass tube which is connected to a sample introduction port 23 and a sample discharge port 25 of the Stark-Zeeman EPR cavity resonator by the greaseless joint. First, the cock 24 is closed and at the same time the cocks 30 and 28 are opened to exhaust the gas inside the system by a pump through an exhaust port 26. Next, the cock 28 is closed and, while reading the pressure by a vacuum gauge 21, the cock 15 is slightly opened to introduce a part of the sample into the resonator 20A. When the pressure reaches 0.1 Torr, the cock 15 is closed, in which condition the Stark modulation electrodes of the resonator are activated and, while irradiating a microwave, the external magnetic field is swept slowly by an electromagnet M, with the result that only the magnetic resonance spectrum of NO is detected. Next, the cock 15 is opened to the full to introduce all the remaining sample into the resonator, then the cocks 15 and 30 are closed, and, thereafter, in order to make the pressure inside the cavity normal, the cock 24 is opened only for a short time to introduce a gas not containing NO and $NO_2$, for example, pure air, through a gas introduction port 19 to make one atmospheric pressure. For this normal pressure gas sample, the Zeeman modulation coils of the resonator are activated and, while irradiating a microwave, the magnetic field is swept slowly by M, with the result that only the magnetic resonance spectrum of $NO_2$ is detected. This example refers to the case where the sample is collected in the sample tube 10A, but, in place thereof, a sample collecting pipe with a needle valve provided midway may be used to take in a polluted air sample directly from 17.

The steps for obtaining the EPR spectra of the sample collected in the cavity resonator are explained in more detail hereunder. A Stark-Zeeman modulation cavity resonator 20A (or a Zeeman modulation cavity resonator 20B) is disposed between the magnetic poles of an electromagnet M for applying an external magnetic field. The resonator 20A, in the present device as shown in FIG. 1, is a C band TEoln mode cylindrical cavity resonator which resonates at a microwave frequency. A pair of Stark electrodes 53 are provided and a sine wave of 100 $KH_z$ and a DC voltage are applied through a lead wire (not shown). 55 is a Helmholtz coil for Zeeman modulation and a sine wave current of 100 KHz is applied through a lead wire (not shown) to modulate the magnetic field. The resonator 20A is connected to a microwave circuit through, for example, a microwave coupling hole. And forms a part of a microwave bridge. As a microwave is of fixed frequency and, moreover, AFC (automatic frequency control) is applied to the resonance frequency of the resonator 20A, the frequency stability is very high and hence high sensitivity is obtained. The spectrum to be observed is a magnetic resonance spectrum. If the external magnetic field is changed slowly by the electromagnet M, then, in the resonance field, there occurs adsorption of the microwave in the resonator. The adsorption of the microwave in the resonator gives rise to unbalance of the microwave bridge, the result being recorded as a signal on a recorder through a phase-sensitive detector and an amplifier. The resonator 20A is kept completely airtight and, at the same time, the electrical insulation between the Stark electrodes is effected by a teflon spacer. The steps for obtaining EPR spectra described herein are also the same in FIGS. 2 and 3.

Figure 2:
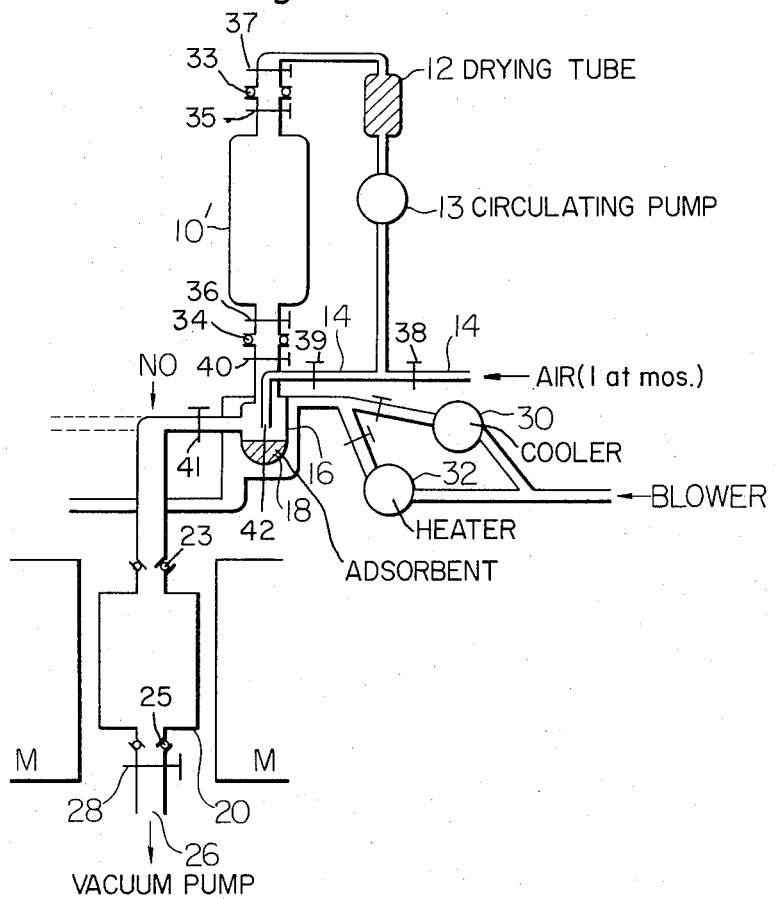
FIG. 2 is similar to FIG. 1 except that it is suitable to detect NO or $NO_2$ of low concentration.

A device shown in FIG. 2 may be suitable to detect low concentration NO and/or $NO_2$. In this arrangment a sample tube 10' whose volume is 80 – 500 cc is used. After a sample gas is collected in the tube 10' it is connected by the greaseless joints 33 and 34 in the place shown.

Cocks 28, 35, 36, 37, 38, 39, 40 and 41 are all greaseless cocks. Other gas circulation systems are all made up of hard glass. The cocks 38 and 41 are closed and the cocks 35, 36, 37, 39 and 40 are opened to circulate a sample gas in the direction of an arrow head by a circulating pump 13. This circulating pump 13 is made of hard glass, with a spherical air valve made of glass being operated by the reciprocating motion of a teflon piston set in a glass tube. The teflon piston has an iron piece embedded in the inner side thereof, a magnetic field being applied thereto periodically from outside thereby allowing the teflon piston to effect reciprocating motion. Accordingly, the material quality of the portions with which the sample gas comes into contact is limited to glass or teflon. 12 is a drying tube containing $P_2O_5$, the sample being completely dehydrated during its passage through said tube. This drying tube may be omitted according to circumstances. For example, in cases where it is clear that, in the sample gas, $NO_2$ is not present, and, accordingly it suffices to detect and quantitatively measure NO alone, the drying tube can be dispensed with. However, in cases where the detection and quantitative measurement of $NO_2$ of low concentration are required, the drying tube 12 is indispensable and, moreover, it has such construction as to carry out dehydration completely. The sample gas thus completely dehydrated in advance by 12 is sent out by the pump 13, passed through 42 to cool to a low temperature and blown upon an adsorbent 18. This adsorbent 18 is diatomaceous earth fire brick powder (Chamelite FK 60 –80 mesh) 1g and is kept cooled typically to approximately −80°C. The cooling of an adsorption section 16 is carried out by passing the air sent by a blower into a cooler 30 to thereby apply cold air to the outer side of the adsorption section 16. The cooler 30 consists of a liquid nitrogen-containing Dewar bottle provided with an electric heater. An electric current is applied to the electric heater to generate a low temperature nitrogen gas, which is blown against 16 by the blower. By adjusting the heater current, the temperature of 18 can be maintained at an optional temperature between normal temperature and −196°C. This low temperature adsorption is carried out for a sufficient time, after which the cocks 39 and 40 are closed and at the same time the cock 41 is opened to exhaust the residual gas completely through an exhaust port 26. Thereafter, the cock 28 is closed, and, in the same manner as above, the air from the blower is passed through a heater 32 and applied to the outer side of the adsorption section 16 to heat and separate the adsorbed components. Typically, the heating temperature is approximately 200°C. The heater 32 consists of a metal tube with an electric heated fixed therein by an insulator. Here, too, by adjusting the heater current, the temperature of 18 can be maintained at an optional temperature between normal temperature and approximately 300°C. The gas thus separated is collected in the cavity resonator. If, as 20A, use is made of a C band cavity, resonator having a capacity of 670cc, then, in most cases of various kinds of polluted samples of which the analytical values of NO and $NO_2$ are required, the sample pressure inside the resonator finally obtained by the above-mentioned operation is 0.05 – 0.1 Torr, this as it is being the optimum sample pressure for the analysis of NO. Therefore, the cock 41 is closed and, immediately, the detection and quantitative measurement of NO are carried out in the same manner as in the explanation of FIG. 1. Similarly, the cocks 38, 39 and 41 are temporarily opened to introduce a gas not containing NO and $NO_2$, for example, pure air, through 14 to thereby make the pressure inside 20A normal, and, thereafter, the detection and calculation of $NO_2$ are carried out.

Figure 3:
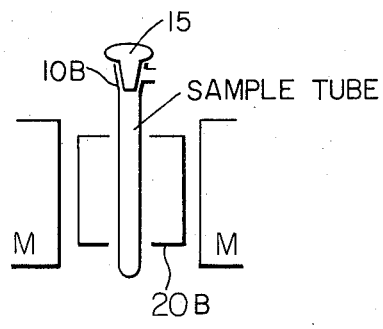
FIG. 3 is similar to FIG. 1 except that it is suitable to use in detecting high or low concentration $NO_2$.

In the case of $NO_2$ of high concentration, it may be measured in such construction as in FIG. 3 by inserting a collected normal pressure polluted air sample-containing quartz tube 10B directly in an EPR cavity resonator 20B. The resonator 20B may be an ordinary X band Zeeman modulation cavity resonator having a pair of Helmholtz coils at the outside of the cavity for applying Zeeman modulation of 100 KHz, for example.

For high concentration $NO_2$, it can be detected with the sample tube 10 of quartz by inserting it directly into the EPR cavity as shown in FIG. 3.

EXAMPLE 1

| | |
|---|---|
| sample gas | room air, moisture 65% NO . . . 1ppm |
| measuring method | FIG. 2 |
| sample tube volume | 500cc |
| cold-adsorption time | 15min |
| heating time after exhaustion of residual gas | 5min |
| pressure in C band resonator | 0.045 Torr |

Figure 4:
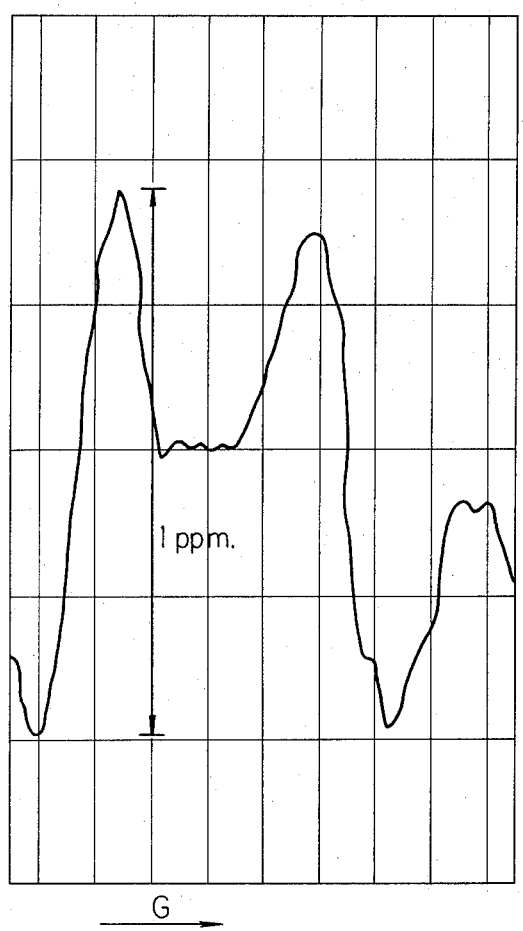
FIG. 4 shows an experimental NO data obtained by using the device shown in FIG. 2 and using room air as sample gas.

The result is shown in FIG. 4 in which S/N ratio of the spectrum of NO (1 ppm) is about 30.

EXAMPLE 2

| | |
|---|---|
| sample gas | air conditioning NO . . . 20 ppm. $C_rH_r$ . . . 0.5% and $H_2O$ . . . 0.3% |
| measuring method | FIG. 2 |
| sample tube volume | 80 cc |
| cold-adsorption time | 10 min |
| heating time after exhaustion of residual gas | 5 min |
| pressure of C band resonator | 0.06 Torr |
| result | NO . . . 20 ppm is detected with error of ±2% |

EXAMPLE 3

| | |
|---|---|
| sample gas | standard sample air containing NO . . . 10000 ppm $SO_2$ . . . 2% $CO_2$ . . . 15% $H_2O$ . . . 3.5% |
| measuring method | FIG. 1 |
| sample tube volume | 10 cc |
| sampling and measuring time | 30 sec |
| pressure in C band resonator | 0.1 Torr |
| result | 10000 ppm NO is detected with error ±2% |

EXAMPLE 4

| | |
|---|---|
| sample gas | automobile exhaust gas at idling |
| measuring method | FIG. 2 |
| sample tube volume | 80 cc |
| cold-adsorption time | 10 min |
| heating time after exhaustion of residual gas | 5 min |
| pressure in C band resonator | 0.06 Torr |

Figure 5:
FIG. 5 shows another experimental NO data obtained by using the same device in FIG. 4 and using automobile exhaust gas at idling as sample gas and FIG. 6 shows another experimental data obtained for $NO_2$ by using the device shown in FIG. 3 and using air as sample gas.

The result is shown in FIG. 5 in which the spectrum strength corresponds to NO (15.5 ppm) in the exhaust gas.

EXAMPLE 5

| | |
|---|---|
| sample gas | air containing $NO_2$ (100 ppm) |
| measuring method | FIG. 3 |
| sample tube volume | 10 cc |
| sampling and measuring time | 30 sec |
| measuring pressure | atmospheric pressure |

Figure 6:
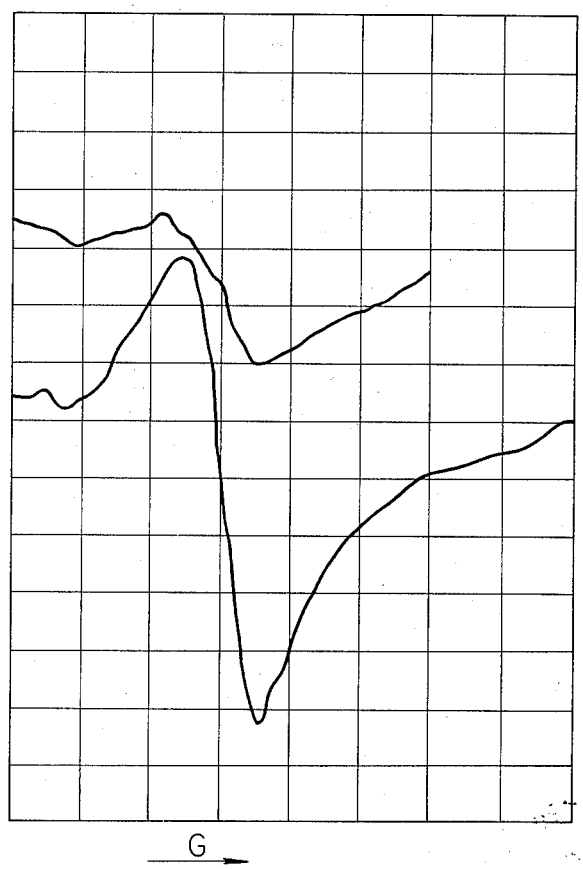

The result is shown in FIG. 6.

EXAMPLE 6

| | |
|---|---|
| sample gas | air containing $NO_2$ (1 ppm) and $C_2H_5-NO_2$ (100 ppm) |
| measuring method | *FIG. 3 ** the modification of FIG. 2 |
| sample tube volume | * 500 cc ** 10 cc |
| adsorption time | 10 min |
| heating time after exhaustion of residual gas | 5 min |
| measuring pressure | atmospheric |
| result | only $NO_2$ (1 ppm) is detected with error ±10% |

EXAMPLE 7

| | |
|---|---|
| sample gas | air containing $NO_2$ (1%) |
| measuring method | FIG. 3 |
| sample tube volume | 10 cc |
| sampling and measuring | |

| | |
|---|---|
| time | 20 sec |
| measuring pressure | atmospheric |
| result | NO₂ (1%) is detected with error ±2% |

EXAMPLE 8

| | |
|---|---|
| sample gas | boiler exhaust gas |
| measuring method | FIG. 3 |
| sampling tube volume | 10 cc |
| sampling and measuring time | 20 sec |
| measuring pressure | atmospheric |
| result | NO₂ (260 ppm) is detected with error ±5% |

EXAMPLE 9

| | |
|---|---|
| sample gas | air containing n—C₆H₁₄ (19%) and NO₂ (60 ppm) measuring method FIG. 3 |
| sample tube volume | 10 cc |
| sampling and measuring time | 60 sec |
| measuring pressure | atmospheric |
| result | NO₂ (60 ppm) is detected with error ±10% |

What is claimed is:

1. A method for measuring NO and/or $NO_2$ in pollution gas comprising the steps of sampling the pollution gas in a sample tube whose internal volume is about 10 cc – 500 cc, feeding the contents of said sample tube into a C band EPR cylindrical TEoln mode cavity resonator which is evacuated and which is provided with Stark electrodes and Zeeman modulation coils, detecting the NO spectrum by applying only Stark modulation and thereafter feeding air into the cavity to establish an atmospheric pressure therein, and then detecting the $NO_2$ spectrum by applying only Zeeman modulation.

2. A method for measuring concentration $NO_2$ in pollution air comprising the steps of sampling said pollution air in a sample tube whose internal volume is about 10 cc, inserting said sample tube directly into an X band EPR cylindrical TEoln mode cavity resonator provided with Zeeman modulation coils and detecting the $NO_2$ spectrum by applying Zeeman modulation with said sample substantially at atmospheric pressure.

3. A method for measuring low concentration $NO_2$ in pollution air comprising the steps of sampling the pollution air in a sample tube whose inner volume is about 10 cc, evacuating a C band EPR cylindrical TEoln mode cavity resonator provided with Zeeman modulation coils, interconnecting said sample tube and the cavity to fill the cavity with low pressure sample air and detecting the $NO_2$ spectrum by applying Zeeman modulation.

4. A method for measuring low concentration NO and $NO_2$ in pollution air comprising the steps of sampling the pollution air in a sample tube whose inner volume is about 80 – 500 cc, cold-adsorbing the contents of said sample tube in an adsorbent for a predetermined period of time, exhausting the residual gas content, heat-discharging the adsorbed gas content from said adsorbent, feeding the discharged gas content into a C band EPR cylindrical TEoln mode cavity resonator provided with Stark electrodes and Zeeman modulation coils detecting the NO spectrum by applying Stark modulation and thereafter introducing atmospheric air into said cavity to raise the inner pressure thereof up to atmospheric pressure and detecting the $NO_2$ spectrum by applying Zeeman modulation.

5. A method for measuring NO and $NO_2$ as set forth in claim 4, further comprising the step of removing water content of the sample gas in said sample tube before said cold-adsorption thereof.

6. A method for measuring high concentration $NO_2$ in pollution air comprising the steps of sampling the pollution air in a small volume sample tube, feeding the contents of said sample tube into a C band EPR cylindrical TEoln mode cavity resonator provided with Zeeman modulation coils, introducing air into said cavity to raise the inner pressure thereof up to atmospheric pressure and detecting the $NO_2$ spectrum by applying Zeeman modulation with the sample substantially at atmospheric pressure.

7. A device for measuring low concentration NO and $NO_2$ in pollution air comprising a small volume sample tube for sampling the pollution air, a gas adsorbing means adapted to be connected with said sample tube for adsorbing the contents of said sample tube, means coupling said gas adsorbing means to said sample tube, means for cooling said gas adsorbing means when the adsorption is performed, an evacuating means for removing a residual gas content in said gas adsorbing means after completion of cold-adsorption, a heating means for heating said adsorbing means to discharge the adsorbed contents from said adsorbing means at a desired instant, an evacuated C band EPR cylindrical TEoln mode cavity resonator having Stark electrodes and Zeeman modulation coils, said evacuated C band EPR cylindrical TEoln mode cavity resonator being coupled to said adsorbing means and being adapted to receive the discharged contents from said adsorping means by the actuation of said heating means, and means for introducing air into said cavity containing the discharged gas content to establish an atmospheric pressure therein.

8. A device according to claim 7 comprising an inlet conduit having cocks respectively connecting the cavity of said cavity resonator to said sample tube and to air; and an exhaust conduit adapted to evacuate said cavity.

* * * * *